United States Patent
Parker

(10) Patent No.: US 11,623,751 B2
(45) Date of Patent: Apr. 11, 2023

(54) SPREADER WITH OPEN SLOT FOR PASSENGER SEAT

(71) Applicant: Safran Seats USA LLC, Gainesville, TX (US)

(72) Inventor: Charles Michael Parker, Irvine, CA (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/466,970

(22) Filed: Sep. 3, 2021

(65) Prior Publication Data

US 2023/0070844 A1    Mar. 9, 2023

(51) Int. Cl.
*B64D 11/06* (2006.01)

(52) U.S. Cl.
CPC ........ *B64D 11/0693* (2013.01); *B64D 11/064* (2014.12); *B64D 11/0647* (2014.12)

(58) Field of Classification Search
CPC .............. B64D 11/0693; B64D 11/064; B64D 11/0647

USPC ....................................................... 244/118.6
See application file for complete search history.

(56) References Cited

U.S. PATENT DOCUMENTS

| | | | |
|---|---|---|---|
| 2011/0101162 A1* | 5/2011 | Zimmermann | .... B64D 11/0693 244/118.6 |
| 2017/0021930 A1* | 1/2017 | Henshaw | ............. B64D 11/064 |
| 2017/0174345 A1* | 6/2017 | Murnan | ............. B64D 11/0641 |
| 2018/0050803 A1* | 2/2018 | Le | ........................ B60N 2/838 |
| 2018/0264979 A1* | 9/2018 | Lasell | ................. B60N 2/4249 |
| 2019/0263526 A1* | 8/2019 | Rife | .................... B64D 11/0619 |
| 2020/0247546 A1* | 8/2020 | Wong | ................. B64D 11/0647 |
| 2020/0391869 A1* | 12/2020 | Sikorski | ............ B64D 11/0693 |

FOREIGN PATENT DOCUMENTS

WO    WO2021021162    *   2/2021

* cited by examiner

*Primary Examiner* — Mark R Wendell
(74) *Attorney, Agent, or Firm* — Kilpatrick Townsend & Stockton LLP

(57) ABSTRACT

A passenger seat includes a spreader with one or more open slot. The slot may be positioned on a lateral side of the spreader and may receive a portion of a seat base of the passenger seat within the slot. In some aspects, the slot may be elongated, and an insertion opening for the slot is provided in a top side of the spreader.

17 Claims, 4 Drawing Sheets

SPREADER WITH OPEN SLOT FOR PASSENGER SEAT

FIELD OF THE INVENTION

The field of the invention relates to passenger seats, and, more particularly, to spreaders with open slots for passenger seats.

BACKGROUND

Passenger vehicles, such as aircraft, buses, trains, ships, and automobiles, often include one or more passenger seats in which passengers may be seated and otherwise use during travel. A passenger seat may include a spreader that may allow a seating cushion of the passenger seat to be attached to the passenger seat. Traditionally, installation of seating cushions using such spreaders has been labor-intensive and time-consuming. Additionally, other spreaders may not provide an acceptable amount of stability or rigidity for use in passenger seats for passenger vehicles.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a spreader for a passenger seat includes a forward end, an aft end opposite from the forward end, a top side, a bottom side opposite from the top side, a first side extending from the forward end to the aft end, and a second side opposite from the first side and extending from the forward end to the aft end. The spreader also includes a slot on the first side and configured to receive a portion of a base assembly within the slot, wherein the slot is elongated, and wherein the top side defines an insertion opening providing access to the slot.

In some embodiments, the slot is a first slot and the insertion opening is a first insertion opening, and the spreader further includes a second slot on the first side. The second slot may be elongated, and the top side defines a second insertion opening providing access to the second slot. In some cases, the second insertion opening is between the first insertion opening and the aft end.

In various embodiments, at least one characteristic of the second slot is different from the first slot. In certain cases, the at least one characteristic includes at least one of a height of the insertion opening, a length of the insertion opening, a length of the second slot, an angle of the second slot relative to a horizontal axis, or a shape of the second slot.

In some embodiments, the slot is a first slot and the insertion opening is a first insertion opening, and the spreader further includes a second slot on the second side. The second slot may be elongated, and the top side may define a second insertion opening providing access to the second slot. In certain aspects, the first insertion opening is aligned with the second insertion opening between the forward end and the aft end.

In various embodiments, the insertion opening includes a forward edge and an aft edge, and the forward edge and the aft edge are coplanar. In some examples, the insertion opening includes a forward edge and an aft edge, and the forward edge and the aft edge are non-coplanar. In certain embodiments, the aft edge is vertically above the forward edge and the insertion opening is angled upwards in a forward and aft direction. The insertion opening may optionally define a greatest width of the slot. In some cases, the slot is elongated towards the forward end from the insertion opening.

In certain embodiments, a passenger seat includes the spreader and a base assembly having a roller. The roller may be positioned in the slot via the insertion opening. In some embodiments, the passenger seat further includes a seatback, and the seatback is fixed relative to the base assembly. The passenger seat may include an anchor configured to engage the base assembly when the roller is positioned in the slot.

According to certain embodiments of the present invention, a spreader for a passenger seat includes a forward end, an aft end opposite from the forward end, a top side, a bottom side opposite from the top side, a side extending from the forward end to the aft end, and a slot on the side and configured to receive a portion of a base assembly within the slot. The slot optionally includes an insertion opening in the top side, and the slot optionally may be elongated towards the forward end from the insertion opening.

In some examples, the slot is a first slot and the insertion opening is a first insertion opening, and the spreader includes a second slot on the side that is elongated and includes a second insertion opening providing access to the second slot. In some cases, the insertion opening includes a forward edge and an aft edge, and the aft edge is vertically above the forward edge.

According to certain embodiments of the invention, a spreader for a passenger seat includes a forward end, an aft end opposite from the forward end, a top side, a bottom side opposite from the top side, a side extending from the forward end to the aft end, and a slot on the side and configured to receive a portion of a base assembly within the slot. The top side defines an insertion opening with a forward edge and an aft edge, and the insertion opening provides access to the slot. The insertion opening includes a maximum width of the slot.

In some embodiments, the slot is a first slot and the insertion opening is a first insertion opening, and the spreader includes a second slot on the side. The second slot may be elongated, and the top side may define a second insertion opening providing access to the second slot. In various cases, the second insertion opening includes a forward edge and an aft edge, and the aft edge of the second insertion opening is vertically above the forward edge of the first insertion opening, the aft edge of the first insertion opening, and the forward edge of the second insertion opening.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide spreaders with open slots for passenger seats. While the spreaders with open slots are discussed for use with aircraft seats, they are by no means so limited. Rather, embodiments of the spreaders with open slots may be used in passenger seats or other seats of any type or otherwise as desired.

Figure 1:
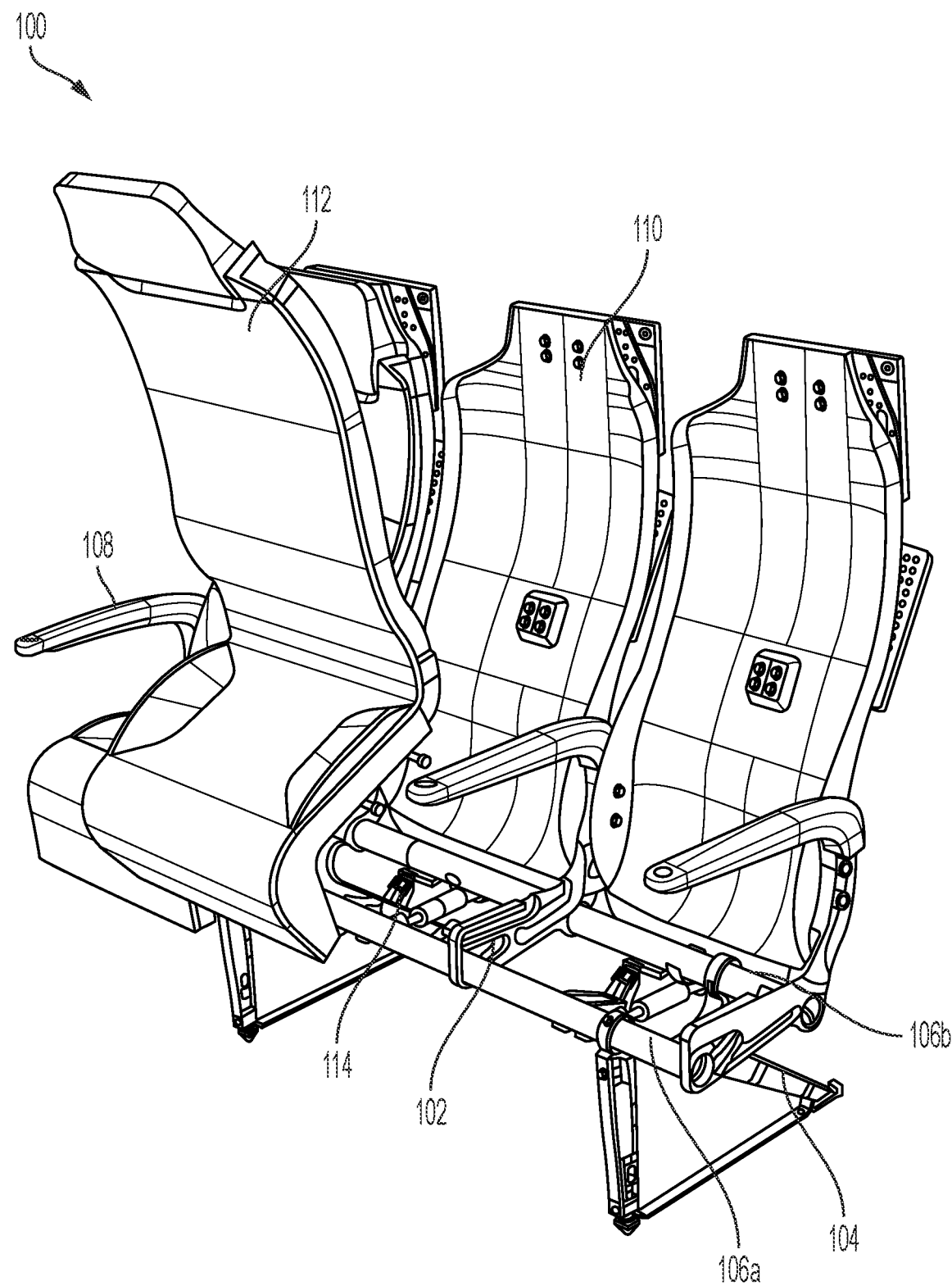
FIG. 1 is a perspective view of a passenger seat with a spreader, according to certain embodiments of the present invention.

FIG. 1 is a perspective view of a passenger seat 100, according to certain embodiments of the present invention. As illustrated, the passenger seat 100 includes a spreader 102, a leg assembly 104, baseframe tubes 106a-b, an armrest 108, a seat back assembly 110, and a seat base 112. The passenger seat 100 may include other suitable number of components (e.g., fewer or greater than the illustrated number of components). The components and sub-components of the passenger seat 100 may be constructed from various suitable materials as desired, including but not limited to, stainless steel, aramid fibers, polycarbonate, polypropylene, aluminum, aluminum alloys, magnesium, magnesium alloys, other metallic materials or non-metallic materials, composite materials, combinations thereof, or other suitable materials. Additionally, the components of the passenger seat 100 illustrated in FIG. 1 may be affixed or otherwise coupled to another component via suitable fasteners, which include but are not limited to screws, bolts, rivets or other mechanical or chemical fasteners. The particular passenger seat 100 illustrated in FIG. 1 should not be considered limiting on the current disclosure, and other types of passengers seats may be utilized as desired.

In certain embodiments, the leg assembly 104 supports or otherwise couples the passenger seat 100 to a floor of a passenger vehicle. The baseframe tubes 106a-b may be coupled to the spreader 102, the leg assembly 104, other suitable components of the passenger seat 100, or a combination thereof, and may provide support to a passenger or other entity that may use the passenger seat 100. The armrest 108 may be coupled to the baseframe tube 106b, the seat back assembly 110, other suitable component of the passenger seat 100, or a combination thereof. The seat back assembly 110 may be coupled to the baseframe tube 106b or other suitable component or combination of components of the passenger seat 100 and may provide support to an entity using the passenger seat 100 (e.g., may allow the entity to lean against the passenger seat 100 without displacing the passenger seat 100). Additionally, the seat back assembly 110 may be fixed relative to one or more portions of the seat base 112 (e.g., a base assembly or rollers of the seat base 112).

The spreader 102 may be positioned in the passenger seat 100 to allow the seat base 112 to be installed on, or otherwise coupled to, the passenger seat 100. For example, the spreader 102 may be coupled to the baseframe tubes 106a-b, to the seat back assembly 110, or other suitable components of the passenger seat 100. Additionally, the seat base 112 may be coupled to the passenger seat 100 in one or more locations. For example, a first portion of the seat base 112 may be positioned in the spreader 102, and the seat base 112 may be rotated rearward to allow a second portion of the seat base 112 to be coupled to an anchoring device 114. Once the seat base 112 is coupled to the spreader 102 and to the anchoring device 114, the passenger seat 100 may be used (e.g., by a passenger or other suitable entity with respect to the passenger vehicle).

Figure 2:
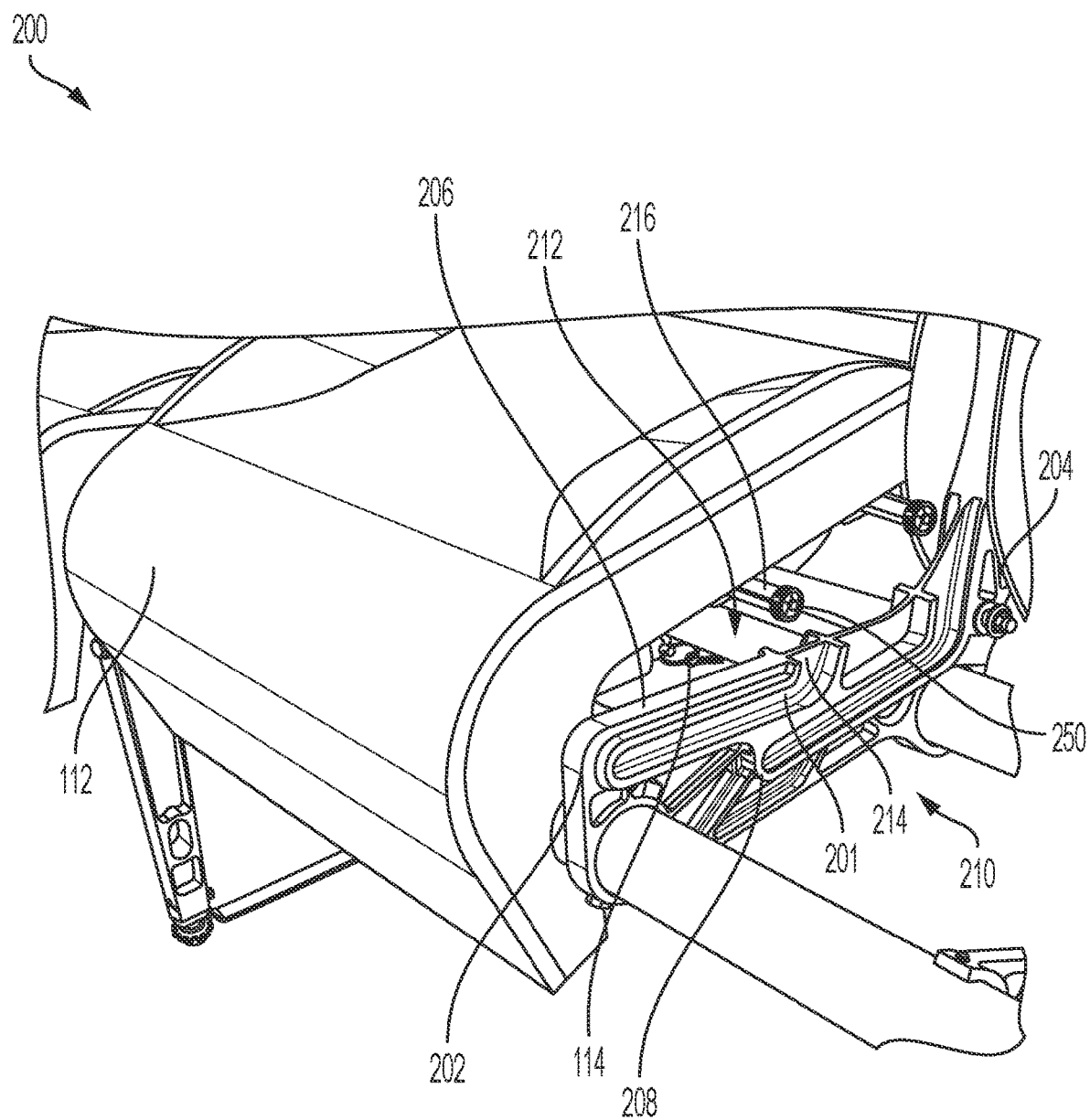
FIG. 2 is a perspective view of the spreader of FIG. 1.
Figure 3:
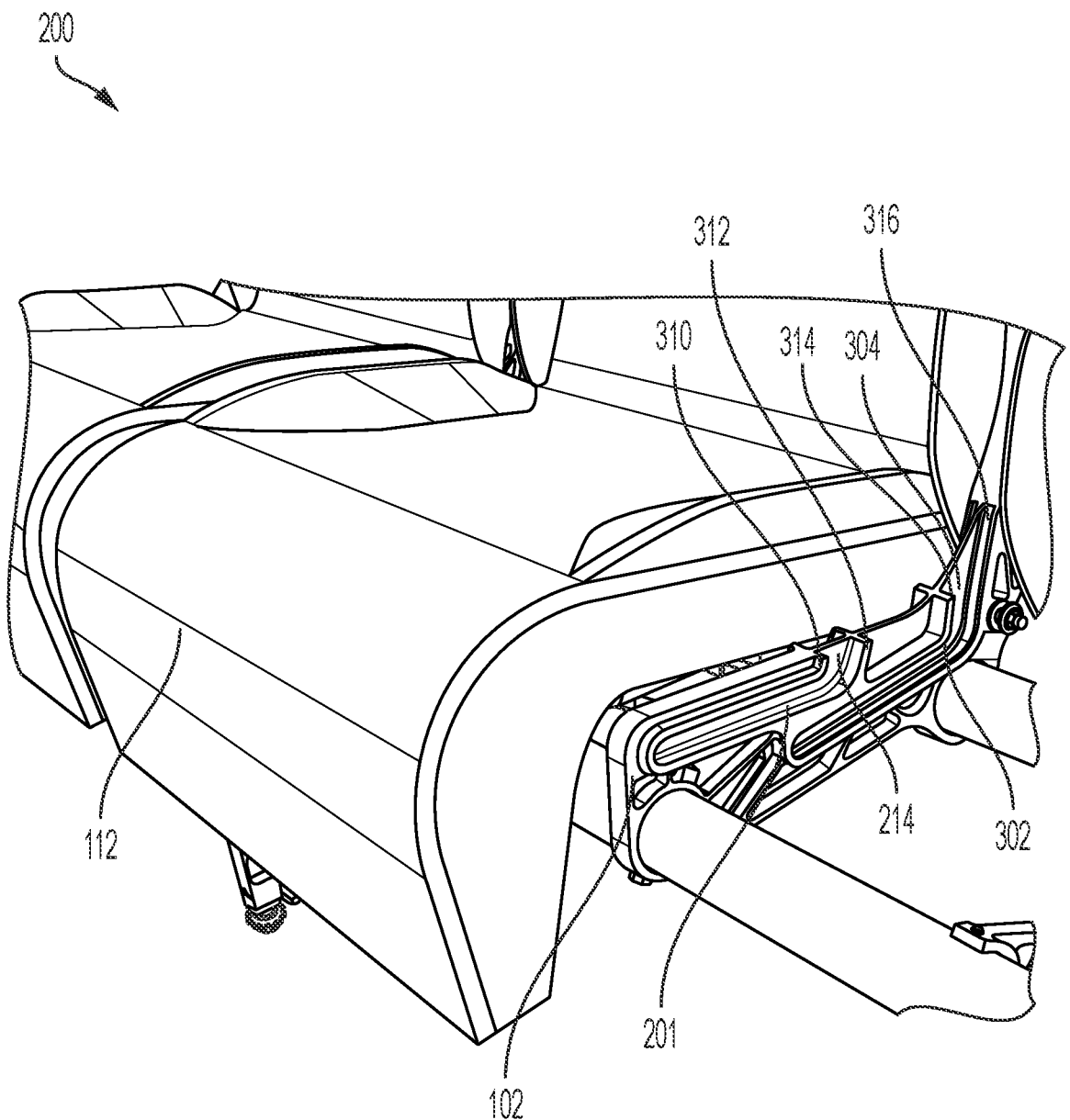
FIG. 3 is a perspective view of the spreader of FIG. 1 with a seating cushion of a passenger seat attached.
Figure 4:
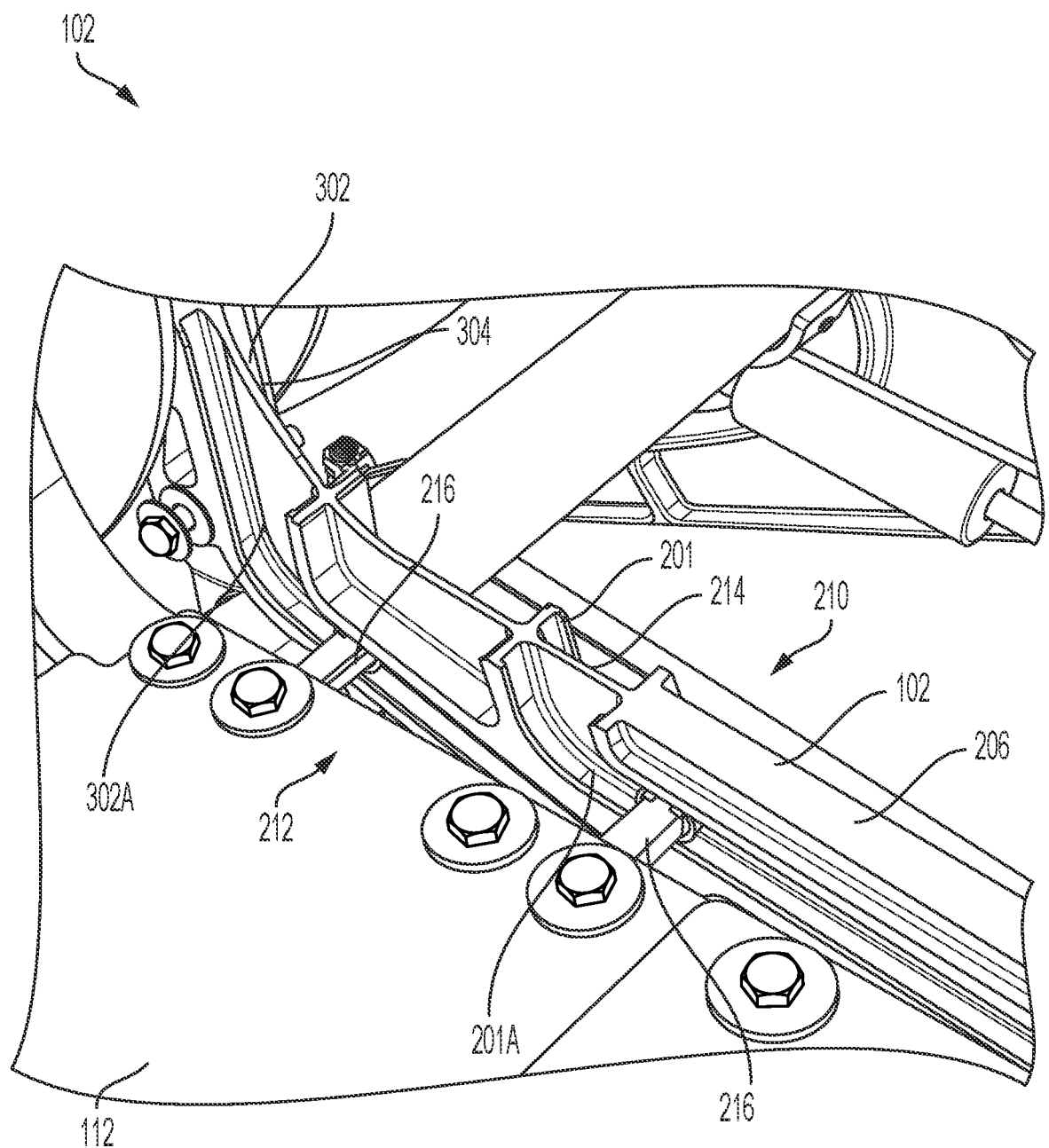
FIG. 4 is another perspective view of the spreader of FIG. 1.

FIGS. 2-4 illustrate the spreader 102 in detail. The spreader 102 may provide similar or improved stability, rigidity, or other suitable performance indicators with respect to the passenger seat 100 compared to other spreaders. Additionally, using the spreader 102 to install the seat base 112, or other suitable component of the passenger seat 100, an amount of time to prepare the passenger seat 100 for use (e.g., installing the passenger seat 100, repairing the passenger seat 100, maintaining the passenger seat 100, etc.) may be reduced compared to the other spreaders.

As illustrated in FIGS. 2-4, in various embodiments, the spreader 102 includes a forward end 202, an aft end 204, a top side 206, a bottom side 208, a first lateral side 210, a second lateral side 212. The aft end 204 is opposite from the forward end 202, the bottom side 208 is opposite from the top side 206, and the first lateral side 210 is opposite from the second lateral side 212. In various embodiments, the first lateral side 210 and the second lateral side 212 may extend from the forward end 202 to the aft end 204.

In certain embodiments, the spreader 102 includes at least one open slot for receiving a portion of a seat base 112, and in certain embodiments, the spreader 102 includes a plurality of open slots for receiving portions of the seat base 112. In the embodiment illustrated, the spreader 102 includes at least one first slot 201 and at least one second slot 302. The at least one first slot 201 and the at least one second slot 302 are each open slots. In various embodiments, the open slots may improve an efficiency of installing the seat base 112. Additionally, the spreader 102 with the open slots may provide similar or improved seating performance (e.g., stability, rigidity, etc.) for the passenger seat 100 during use. The spreader 102 may be constructed from various suitable materials as desired, including but not limited to, stainless steel, aramid fibers, polycarbonate, polypropylene, aluminum, aluminum alloys, magnesium, magnesium alloys, other metallic materials or non-metallic materials, composite materials, combinations thereof, or other suitable materials.

The first slot 201 is on one of the first lateral side 210 or the second lateral side 212. In some embodiments, the first slot 201 is monolithically or integrally formed in the spreader 102, although in other embodiments the first slot 201 may be a separate component or feature that is attached to the spreader 102 using various techniques or mechanisms as desired. As illustrated, the first slot 201 may be elongated (e.g., towards the forward end 202 of the spreader 102). The first slot 201 includes an insertion opening 214 at the top side 206 of the spreader 102 such that the first slot 201 is an open slot. The insertion opening 214 may provide access for positioning components seat base 112 within the first slot 201. In some embodiments, the insertion opening 214 may define a greatest width of the first slot 201. In some examples, and as discussed in detail below, a support assembly 216 of the seat base 112 may be positioned in the first slot 201 via the insertion opening 214. The support assembly 216 may be coupled to, positioned on, or otherwise included in the seat base 112.

As mentioned, in certain embodiments, the spreader 102 includes a second slot 302. The second slot 302 may be similar to the first slot 201 and is elongated and includes an insertion opening 304 at the top side 206 such that the second slot 302 is an open slot. In some embodiments, the insertion opening 304 may be between the insertion opening 214 and the aft end 204 of the spreader 102, although it need not be in other embodiments. Similar to the insertion opening 214, the insertion opening 304 of the second slot 302 may receive a support assembly 216 or other component of the seat base 112.

The first slot 201 and the second slot 302 each include one or more slot characteristics. The slot characteristics may include, but are not limited to, a height of the insertion opening, a length of the insertion opening, a length of the slot, an angle of the slot relative to a horizontal axis, a shape of the slot, other suitable characteristics, or a combination thereof. In some examples, the first slot 201 may include at least one characteristic that is different from the corresponding characteristic of the second slot 302. In one non-limiting example, the height of the second slot 302 may be greater than the height of the first slot 201. In another non-limiting example, the angle of the second slot 302 relative to the horizontal axis may be larger than the corresponding angle of the first slot 201. In some examples, each of the above-listed characteristics may be different with respect to the first slot 201 and the second slot 302.

As best illustrated in FIG. 3, the insertion opening 214 includes a forward edge 310 and an aft edge 312. The forward edge 310 and the aft edge 312 of the insertion opening 214 may be coplanar, such as illustrated in FIG. 3, although in other embodiments, the edges 310, 312 need not be coplanar. Similarly, the insertion opening 304 may include a forward edge 314 and an aft edge 316, which may be coplanar or non-coplanar as desired. In the embodiment illustrated in FIG. 3, the forward edge 314 and the aft edge 316 are not coplanar, and the aft edge 316 is vertically above the forward edge 314. In this example, the insertion opening 304 may be angled upwards in a forward direction and an aft direction. In some examples, the aft edge 316 of the insertion opening 304 may be or may extend vertically above the forward edge 314 of the insertion opening 304, the aft edge 312 of the insertion opening 214, the forward edge 310 of the insertion opening 304, or a combination thereof.

As best illustrated in FIG. 4, in certain embodiments, the spreader 102 includes a second first slot 201A and a second slot 302A provided on the second lateral side 212 of the spreader 102. The slots 201A, 302A may mirror the slots 201, 302, respectively, although they need not in other embodiments. Additionally, while first and second slots are illustrated, in other embodiments, fewer, additional, and/or other combinations of slots may be utilized as desired, and the slot characteristics on a particular lateral side may be, but do not have to be, mirrored. As a non-limiting example, a spreader may have four slots, each of which has a slot characteristic (e.g., slot width) that is different from the other slots.

As illustrated in FIG. 4, a support assembly 216 of the seat base 112 may be received within each open slot. The support assembly 216 may be various devices or components for positioning the seat base 112 relative to the spreader 102. As one non-limiting example, one or more support assemblies 216 may include a roller 250 positionable within a slot.

The spreader 102, or each of the components thereof, may be formed via various manufacturing processes as desired. Suitable manufacturing processes include, but are not limited to, machining, forging, casting, printing, molding, combinations thereof, or other processes as desired. In some embodiments, the manufacturing process used to form one component may be different from the manufacturing process used to form another component. As one non-limiting example, the first lateral side 210 and the second lateral side 212 may be formed via forging, and the first slot 201 may be formed via machining. In certain embodiments, the spreader 102, or at least one of the components thereof, may optionally only be manufactured in two directions (e.g., an x-direction and a y-direction), although in other embodiments it need not be.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A spreader for a passenger seat, the spreader comprising: a forward end; an aft end opposite from the forward end; a top side; a bottom side opposite from the top side; a first side extending from the forward end to the aft end; a second side opposite from the first side and extending from the forward end to the aft end; and a slot on the first side and configured to receive a portion of a base assembly within the slot, wherein the slot is elongated, and wherein the top side defines an insertion opening providing access to the slot.

Illustration 2. The spreader of any preceding or subsequent illustrations or combination of illustrations, wherein the slot is a first slot and the insertion opening is a first insertion opening, and wherein the spreader further comprises a second slot on the first side, wherein the second slot is elongated, and wherein the top side defines a second insertion opening providing access to the second slot.

Illustration 3. The spreader of any preceding or subsequent illustrations or combination of illustrations, wherein the second insertion opening is between the first insertion opening and the aft end.

Illustration 4. The spreader of any preceding or subsequent illustrations or combination of illustrations, wherein at least one characteristic of the second slot is different from the first slot.

Illustration 5. The spreader of any preceding or subsequent illustrations or combination of illustrations, wherein the at least one characteristic comprises at least one of a height of the insertion opening, a length of the insertion opening, a length of the second slot, an angle of the second slot relative to a horizontal axis, or a shape of the second slot.

Illustration 6. The spreader of any preceding or subsequent illustrations or combination of illustrations, wherein the slot is a first slot and the insertion opening is a first insertion opening, and wherein the spreader further comprises a second slot on the second side, wherein the second slot is elongated, and wherein the top side defines a second insertion opening providing access to the second slot.

Illustration 7. The spreader of any preceding or subsequent illustrations or combination of illustrations, wherein the first insertion opening is aligned with the second insertion opening between the forward end and the aft end.

Illustration 8. The spreader of any preceding or subsequent illustrations or combination of illustrations, wherein the insertion opening comprises a forward edge and an aft edge, and wherein the forward edge and the aft edge are coplanar.

Illustration 9. The spreader of any preceding or subsequent illustrations or combination of illustrations, wherein the insertion opening comprises a forward edge and an aft edge, and wherein the forward edge and the aft edge are non-coplanar.

Illustration 10. The spreader of any preceding or subsequent illustrations or combination of illustrations, wherein the aft edge is vertically above the forward edge and the insertion opening is angled upwards in a forward and aft direction.

Illustration 11. The spreader of any preceding or subsequent illustrations or combination of illustrations, wherein the insertion opening defines a greatest width of the slot.

Illustration 12. The spreader of any preceding or subsequent illustrations or combination of illustrations, wherein the slot is elongated towards the forward end from the insertion opening.

Illustration 13. A passenger seat comprising: the spreader of any preceding or subsequent illustrations or combination of illustrations; and a base assembly comprising a roller, wherein the roller is positioned in the slot via the insertion opening.

Illustration 14. The passenger seat of any preceding or subsequent illustrations or combination of illustrations, further comprising a seatback, wherein the seatback is fixed relative to the base assembly.

Illustration 15. The passenger seat of any preceding or subsequent illustrations or combination of illustrations, further comprising an anchor configured to engage the base assembly when the roller is positioned in the slot.

Illustration 16. A spreader for a passenger seat, the spreader comprising: a forward end; an aft end opposite from the forward end; a top side; a bottom side opposite from the top side; a side extending from the forward end to the aft end; and a slot on the side and configured to receive a portion of a base assembly within the slot, wherein the slot comprises an insertion opening in the top side, and wherein the slot is elongated towards the forward end from the insertion opening.

Illustration 17. The spreader of any preceding or subsequent illustrations or combination of illustrations, wherein the slot is a first slot and the insertion opening is a first insertion opening, and wherein the spreader further comprises a second slot on the side, wherein the second slot is elongated, and wherein the top side defines a second insertion opening providing access to the second slot.

Illustration 18. The spreader of any preceding or subsequent illustrations or combination of illustrations, wherein the insertion opening comprises a forward edge and an aft edge, and wherein the aft edge is vertically above the forward edge.

Illustration 19. A spreader for a passenger seat, the spreader comprising: a forward end; an aft end opposite from the forward end; a top side; a bottom side opposite from the top side; a side extending from the forward end to the aft end; and a slot on the side and configured to receive a portion of a base assembly within the slot, wherein the top side defines an insertion opening comprising a forward edge and an aft edge, wherein the insertion opening provides access to the slot, and wherein the insertion opening comprises a maximum width of the slot.

Illustration 20. The spreader of any preceding or subsequent illustrations or combination of illustrations, wherein the slot is a first slot and the insertion opening is a first insertion opening, and wherein the spreader further comprises a second slot on the side, wherein the second slot is elongated, wherein the top side defines a second insertion opening providing access to the second slot, wherein the second insertion opening comprises a forward edge and an aft edge, and wherein the aft edge of the second insertion opening is vertically above the forward edge of the first insertion opening, the aft edge of the first insertion opening, and the forward edge of the second insertion opening.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A spreader for a passenger seat, the spreader comprising:
    a forward end;
    an aft end opposite from the forward end;
    a top side;
    a bottom side opposite from the top side;
    a first side extending from the forward end to the aft end;
    a second side opposite from the first side and extending from the forward end to the aft end; and
    a slot on the first side and configured to receive a portion of a base assembly within the slot, wherein the slot is elongated, and wherein the top side defines an insertion opening providing access to the slot,
    wherein the slot is a first slot and the insertion opening is a first insertion opening, and wherein the spreader further comprises a second slot on the first side, wherein the second slot is elongated, and wherein the top side defines a second insertion opening providing access to the second slot.

2. The spreader of claim 1, wherein the second insertion opening is between the first insertion opening and the aft end.

3. The spreader of claim 1, wherein at least one characteristic of the second slot is different from the first slot.

4. The spreader of claim 1, wherein the at least one characteristic comprises at least one of a height of the insertion opening, a length of the insertion opening, a length of the second slot, an angle of the second slot relative to a horizontal axis, or a shape of the second slot.

5. The spreader of claim 1, wherein the spreader further comprises a second third slot on the second side, wherein the third slot is elongated, and wherein the top side defines a third insertion opening providing access to the third slot.

6. The spreader of claim 5, wherein the first insertion opening is aligned with the third insertion opening between the forward end and the aft end.

7. The spreader of claim 1, wherein the first insertion opening comprises a forward edge and an aft edge, and wherein the forward edge and the aft edge are coplanar.

8. The spreader of claim 1, wherein the first insertion opening comprises a forward edge and an aft edge, and wherein the forward edge and the aft edge are non-coplanar.

9. The spreader of claim 8, wherein the aft edge is vertically above the forward edge and the insertion opening is angled upwards in a forward and aft direction.

10. The spreader of claim 1, wherein the first insertion opening defines a greatest width of the first slot.

11. The spreader of claim 1, wherein the first slot is elongated towards the forward end from the insertion opening.

12. A passenger seat comprising:
the spreader of claim 1; and
a base assembly comprising a roller, wherein the roller is positioned in the first slot via the first insertion opening or in the second slot via the second insertion opening.

13. The passenger seat of claim 12, further comprising a seatback, wherein the seatback is fixed relative to the base assembly.

14. The passenger seat of claim 12, further comprising an anchor configured to engage the base assembly when the roller is positioned in the first slot or the second slot.

15. A spreader for a passenger seat, the spreader comprising:
a forward end;
an aft end opposite from the forward end;
a top side;
a bottom side opposite from the top side;
a side extending from the forward end to the aft end; and
a slot on the side and configured to receive a portion of a base assembly within the slot,
wherein the slot comprises an insertion opening in the top side, and wherein the slot is elongated towards the forward end from the insertion opening,
wherein the slot is a first slot and the insertion opening is a first insertion opening, and wherein the spreader further comprises a second slot on the side, wherein the second slot is elongated, and wherein the top side defines a second insertion opening providing access to the second slot.

16. The spreader of claim 15, wherein the first insertion opening comprises a forward edge and an aft edge, and wherein the aft edge is vertically above the forward edge.

17. A spreader for a passenger seat, the spreader comprising:
a forward end;
an aft end opposite from the forward end;
a top side;
a bottom side opposite from the top side;
a first side extending from the forward end to the aft end;
a second side opposite from the first side and extending from the forward end to the aft end; and
a slot on the first side and configured to receive a portion of a base assembly within the slot, wherein the slot is elongated, and wherein the top side defines an insertion opening providing access to the slot,
wherein the insertion opening comprises a forward edge and an aft edge, and wherein the forward edge and the aft edge are coplanar.

* * * * *